United States Patent
Wong et al.

(10) Patent No.: US 7,356,210 B2
(45) Date of Patent: Apr. 8, 2008

(54) VARIABLE OPTICAL ATTENUATOR MULTIPLEXER WITH A THERMAL ISOLATING OPTICAL JOINT

(75) Inventors: William Wong, Saratoga, CA (US); Tsung-Ein Tsai, San Jose, CA (US); Ping Qu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 672 days.

(21) Appl. No.: 10/877,413

(22) Filed: Jun. 25, 2004
(Under 37 CFR 1.47)

(65) Prior Publication Data
US 2005/0286897 A1    Dec. 29, 2005

(51) Int. Cl.
*G02B 6/12* (2006.01)

(52) U.S. Cl. ........................................ 385/14
(58) Field of Classification Search ............ 385/14, 385/37, 39, 40, 47, 50, 52, 129, 130, 140
See application file for complete search history.

(56) References Cited

U.S. PATENT DOCUMENTS

| | | | |
|---|---|---|---|
| 6,556,749 B2 * | 4/2003 | Uetsuka et al. .............. 385/37 |
| 6,757,452 B2 * | 6/2004 | Shin et al. .................... 385/14 |
| 6,842,572 B2 * | 1/2005 | Johannessen ................ 385/50 |
| 6,954,566 B2 | 10/2005 | Johannessen |
| 2002/0097963 A1 * | 7/2002 | Ukechi et al. ................ 385/50 |
| 2003/0016938 A1 * | 1/2003 | Hatayama et al. .......... 385/140 |

* cited by examiner

*Primary Examiner*—Quyen P Leung
(74) *Attorney, Agent, or Firm*—Marshall Gerstein & Borun LLP

(57) ABSTRACT

A variable optical attenuator multiplexer having at least one thermal isolating optical joint. The variable optical attenuator multiplexer including a plurality of planar lightwave circuit components, such as, for example a combination of an array waveguide grating, a variable optical attenuator, and/or a power monitor. The planar lightwave circuit components are joined with an optical adhesive. The components may be thermally isolated by the formation of a widened space or gap between the component joints, and/or by creating a trench in the optical adhesive.

21 Claims, 3 Drawing Sheets

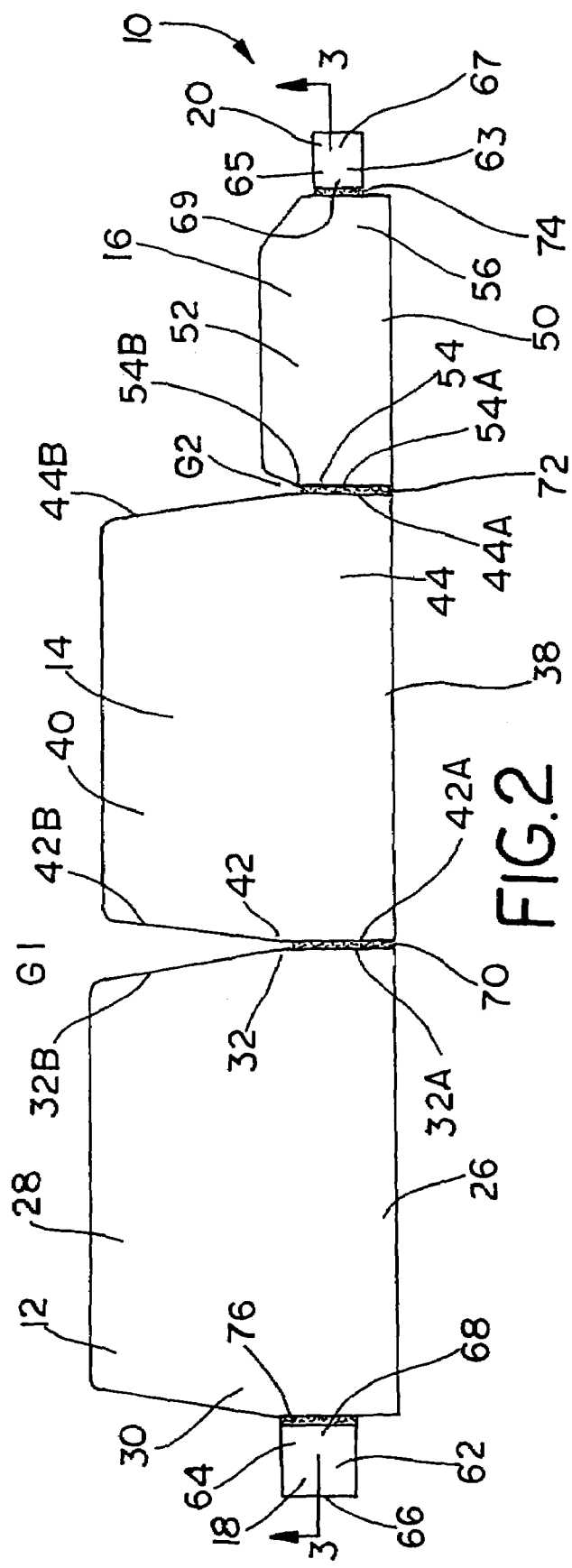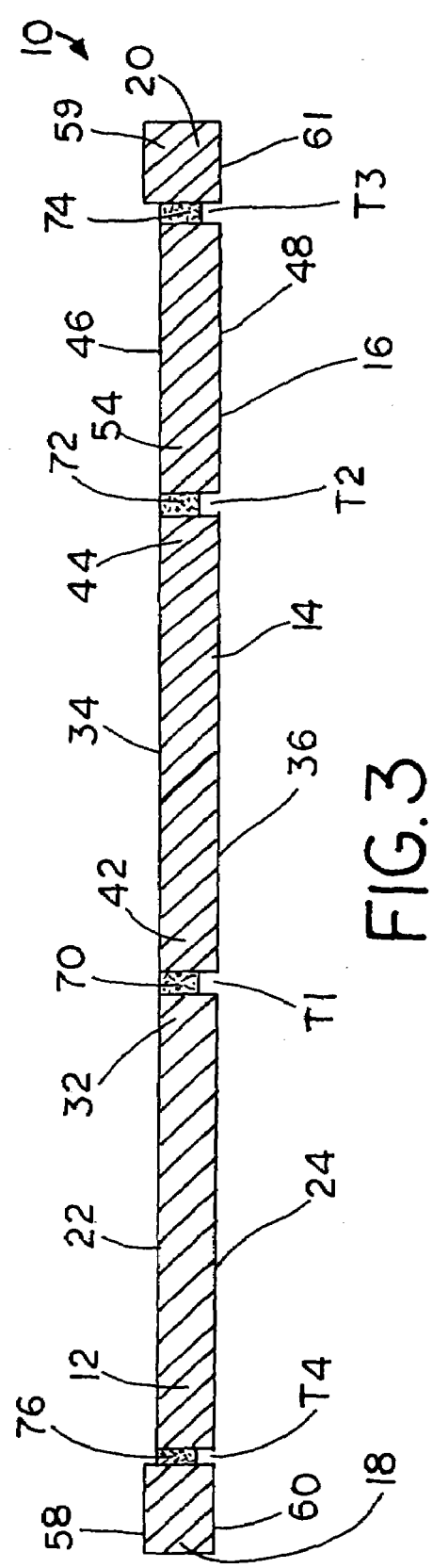

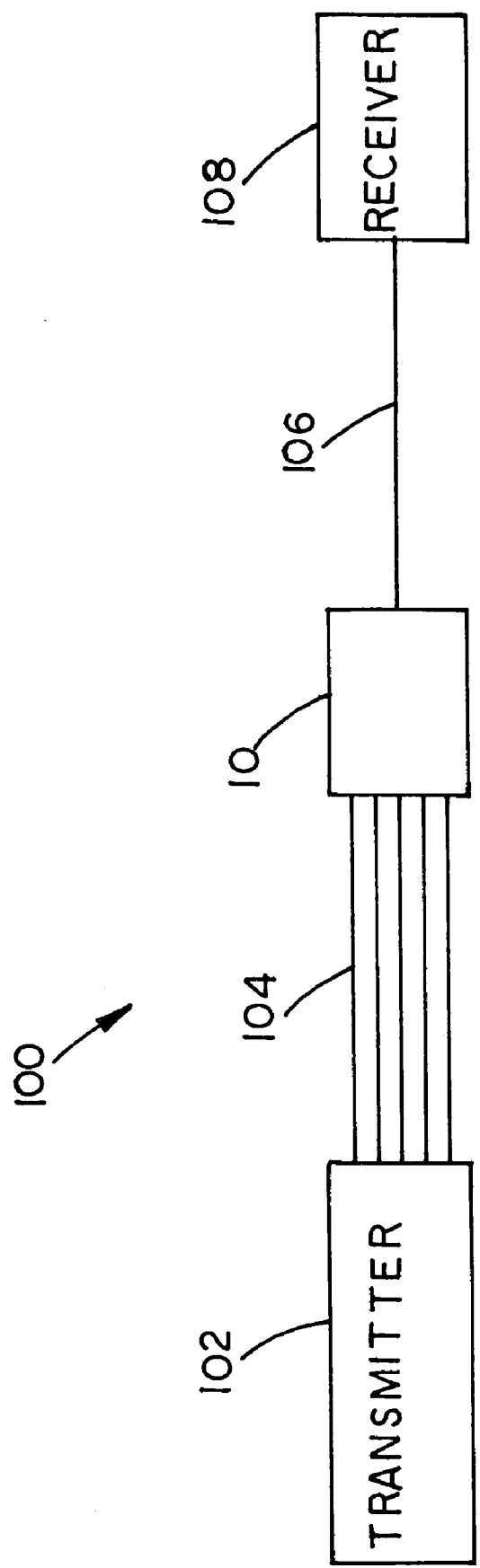

US 7,356,210 B2

VARIABLE OPTICAL ATTENUATOR MULTIPLEXER WITH A THERMAL ISOLATING OPTICAL JOINT

FIELD OF THE DISCLOSURE

The present disclosure relates generally to optical modules and, more specifically, to a variable optical attenuator multiplexer with reduced thermal transmission across optical joints.

BACKGROUND OF RELATED ART

The promulgation of optical networks has been integral to the advancement of information technology. From local-, wide-, and metro-area networks to telecommunication networks to cable television networks, optical networks have brought increased services and information access to consumers. Optical networks offer the high-bandwidth needed for high-volume usage and data intensive content, such has high quality video and audio.

As optical networks become more diverse in type and more complex in operation, more optical components are needed. Network designers are often called upon to build complex systems using equipment from many different vendors. Network designers sometimes look for integrated solutions to solve their networking needs.

Some vendors have implemented component integration, sometimes called "chip-to-chip" integration to meet some of these challenges. With component integration, such as a typical variable optical attenuator multiplexer, the chip-to-chip technology may reduce the number of parts, allow for optimized insertion loss, attenuation range, and/or power consumption, and may reduce the size of the multiplexer compared to a system having each component installed separately. In a typical chip-to-chip design individual components are combined utilizing an optical adhesive or epoxy to form an optical seam. Since, however, silicon is a relatively good thermal conductor, thermal conductivity between chips and across the optical seam (i.e., thermal cross talk) becomes a concern, especially since the optical properties of the components are sometimes varied by fluctuations in temperature. For example, in some embodiments of a variable optical attenuator multiplexer, an array waveguide grating uses temperature control to maintain proper optical properties. Therefore, these component devices often utilize heat sinking and/or power management to insure proper operating temperatures are maintained throughout.

BRIEF DESCRIPTION OF THE DRAWINGS

FIG. 2 is an enlarged top plan view of a plurality of planar lightwave circuits showing an array waveguide grating, a variable optical attenuator and a power monitor, which may be used in the variable optical attenuator multiplexer of FIG. 1.

FIG. 3 is a cross sectional view of the planar lightwave circuit of FIG. 2, taken along the line 3-3 of FIG. 2.

FIG. 4 is a schematic diagram of one example of an optical network in which the variable optical attenuator multiplexer of FIG. 1 may be utilized.

DETAILED DESCRIPTION OF AN EXAMPLE

Figure 1:
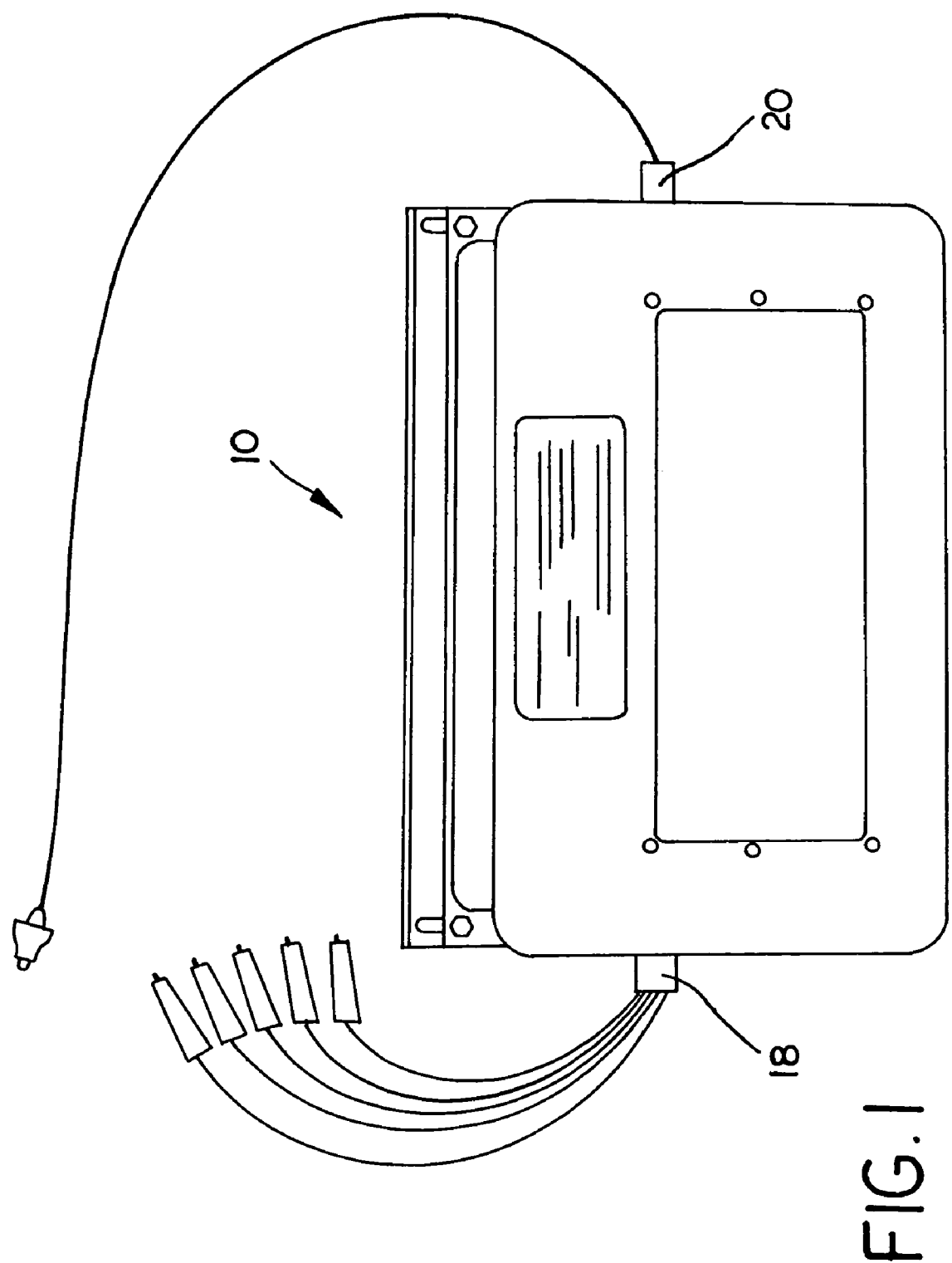
FIG. 1 is a front perspective view of a variable optical attenuator multiplexer assembled in accordance with one example of the teachings of the present invention.

The following description of the disclosed embodiment is not intended to limit the scope of the invention to the precise form or forms detailed herein. Instead the following description is intended to be illustrative of the principles of the invention so that others may follow its teachings.

Referring now to FIG. 1 of the drawings, a variable optical attenuator multiplexer (VOA-MUX) assembled in accordance with the teachings of one embodiment of the present invention is generally referred to by the reference numeral 10. VOA-MUX 10, in one embodiment of the invention, is for insertion in an optical network (FIG. 4), such as, for example, a telecommunication system such as phone and data equipment, or other suitable network in which the VOA-MUX 10 may prove beneficial, as will be described below. However, the teachings of the invention are not limited to any particular environment of use.

Turning to FIGS. 2 and 3, the VOA-MUX 10 includes an array waveguide grating 12, a variable optical attenuator 14, a power monitor 16, and a pair of fiber array blocks 18, 20. The array waveguide grating 12, the variable optical attenuator 14, and the power monitor 16 may be attached end-to-end as illustrated using an optical adhesive as will be described herein below. The array waveguide grating 12, the variable optical attenuator 14, and the power monitor 16 may also be attached in any other suitable arrangement, such as by way of example and not limitation, side-by-side. In the described embodiment, each of the array waveguide grating 12, the variable optical attenuator 14, and the power monitor 16 is a planar lightwave circuit (PLC), which, is an optical circuit that uses silicon wafers in the fabrication process. The components may, however, be manufactured utilizing any number of different materials, such as, by way of example and not limitation, quartz (glass), Silicon Dioxide ($SiO_2$), Silicon Nitrate ($SiN$), or other similar material.

The array waveguide grating 12 includes a pair of opposed faces 22, 24, a first edge 26, a second edge 28, a first side edge 30 and a second side edge 32. The variable optical attenuator 14 includes a pair of opposed faces 34, 36, a first edge 38, a second edge 40, a first side edge 42, and a second side edge 44. Similarly, the power monitor 16 includes a pair of opposed faces 46, 48, a first edge 50, a second edge 52, a first side edge 54 and a second side edge 56. The fiber array block 18 includes a pair of opposed faces 58, 60, a first edge 62, a second edge 64, a first side edge 66, and a second side edge 68. Finally, the fiber array block 20 include a pair of opposed faces 59, 61, a first edge 63, a second edge 65, a first side edge 67, and a second side edge 69.

The array waveguide grating 12 may be any array waveguide grating that is commercially available, or custom designed and manufactured. The array waveguide grating 12 is generally used to multiplex and/or demultiplex (combine and/or separate) an optical signal with respect to the individual wavelengths of light. The array waveguide grating 12 is typically designed and manufactured to have a center wavelength of optical transmission which is equal to a target center wavelength at a predetermined temperature, such as for example, a target wavelength of about 1550 nm or 1310 nm at a temperature of about 50° C. Temperature ranges are usually defined anywhere from between −40° C. and 85° C. The actual wavelength of optical transmission from the array waveguide grating 12, however, often varies as the temperature fluctuates. In at least some applications, it is beneficial to maintain a constant or relatively constant operating temperature which, in the disclosed embodiment, is approximately 80° C.

The variable optical attenuator 14 may also be any variable optical attenuator that is commercially available, or custom designed and manufactured. The variable optical attenuator 14 is generally used to adjust and control the optical signal strength of the optical transmission.

The power monitor 16 may similarly be any power monitor that is commercially available, or custom designed and manufactured. The power monitor 16 is generally used after the variable optical attenuator 14 to measure and control the attenuation level and to maintain a constant known output power.

The fiber array blocks 18, 20 may be configured to receive and retain at least one individual optical fiber adapted to carry or transmit optical signals (see FIG. 1). Each of the fiber array blocks 18, 20 may be any suitable array that is commercially available, or custom designed and manufactured.

Each of the array waveguide grating 12, the variable optical attenuator 14, the power monitor 16, and the fiber array blocks 18, 20 will be designed to cooperate with and function in conjunction with the other components of the VOA-MUX 10, as described in greater detail below. In the illustrated example, all of the components of the VOA-MUX 10 cooperate to form approximately five to twenty waveguides, however, the number of waveguides may vary as desired.

As shown in FIG. 2, the array waveguide grating 12, the variable optical attenuator 14, the power monitor 16, and the fiber array blocks 18, 20 together form the operating components of the VOA-MUX 10. As will be described, each of the components may be separated by at least one thermal isolator to assist in the maintaining of a proper operating temperature. In the disclosed example, the second side edge 32 of the array waveguide grating 12 abuts the first side edge 42 of the variable optical attenuator 14 and the two edges are joined together with an optical adhesive to form a seam 70. The optical adhesive used may be any optical adhesive, such as an optical epoxy or other like adhesive. In this example, the two edges of the seam 70 are physically separated by less than a few microns, adhered together utilizing any known optical adhesive, and the seam 70 is both optically and thermally conductive.

In the embodiment illustrated in FIG. 2, the second side edge 32 of the array waveguide grating 12 includes a first edge portion 32A and a second edge portion 32B. Similarly, the first side edge 42 of the variable optical attenuator 14 includes a first edge portion 42A and a second edge portion 42B. The first edge portion 32A abuts at least a portion of the first edge portion 42A forming the seam 70. The second edge portion 32B is spaced away from the second edge portion 42B forming a gap G1. The gap G1 is a thermal isolator, generally resistant to both optical and thermal conductivity, thereby reducing the thermal transmission between the two components.

The shape and size of the gap G1 may vary based on various design choices, and manufacturing techniques, and may include u-shaped, rectangular, square, circle, and/or any other similar shape. In the illustrated embodiment, however, the gap G1 is generally v-shaped, having an interior included angle of approximately sixteen degrees (16°). The gap G1 extends approximately one fourth to one half of the distance between the rear edge 28 and the front edge 26 of the array waveguide grating 12. The gap G1 may be formed in the planar lightwave circuit utilizing known manufacturing techniques, including the cutting of the planar lightwave circuit.

Turning to FIG. 3, the seam 70 also may include an optical trench T1 extending into the seam 70. In the illustrated embodiment, the trench T1 is generally u-shaped and extends approximately one fourth to one half of the distance between the opposed surfaces 22 and 24. The shape and size of the trench T1 may also vary based on various design choices, and manufacturing techniques, as long as the seam 70 allows the joined components to optically communicate with each other within acceptable design considerations which are driven by the tolerances of each of the joined components. The trench T1 may be formed in the seam 70 by, for example, depositing the optical adhesive into the seam 70, and cutting the seam 70 to remove the deposited adhesive.

Similar to the gap G1, the trench T1 is generally resistant to both optical and thermal conductivity, thereby reducing the thermal transmission between the two components and acting as a thermal isolator. Both the gap G1 and the trench T1 may, either alone or in combination, act as a thermal isolator to reduce the thermal transmissions between the array waveguide grating 12 and the variable optical attenuator 14. In the disclosed embodiment, by combining the gap G1 and the trench T1, the thermal isolation of the array waveguide grating 12 from the variable optical attenuator 14 is sufficient to generally maintain the desired operating temperature of the array waveguide grating 12 (approximately 80° C.) regardless of the extent of the thermal fluctuation which occurs in the variable optical attenuator 14.

Turning again to FIG. 2, the second side edge 44 of the variable optical attenuator 14 abuts the first side edge 54 of the power monitor 16 and the two edges are joined together with an optical adhesive to form a seam 72. Additionally, the second side edge 68 of the fiber array block 18, 20 abut and are joined via an optical adhesive to the second side edge 56 of the power monitor 16 and the first side edge 30 of the array waveguide grating 12 to form seams 74 and 76 respectively. Similar to the seam 70, the edges of the seams 72, 74, and 76 are physically separated by less than a few microns and the seams 72, 74 and 76 are both optically and thermal conductive.

The second side edge 44 of the variable optical attenuator 14 includes a first edge portion 44A and a second edge portion 44B. Similarly, the first side edge 54 of the power monitor 16 includes a first edge portion 54A and a second edge portion 54B. The first edge portion 44A abuts at least a portion of the first edge portion 54A forming the seam 72. The second edge portion 44B is spaced away from the second edge portion 54B forming a v-shaped gap G2. The gap G2 is generally resistant to both optical and thermal conductivity, thereby reducing the thermal transmission between the two components, and the shape and size of the gap G2 may vary based on various design choices and manufacturing techniques. In the illustrated embodiment, however, the gap G2 is generally v-shaped and extends approximately one half of the distance between the rear edge 40 and the front edge 38. While the seams 74 and 76 do not, in the illustrated embodiment contain any gaps, the seams 74 and 76 may in fact be designed with gaps as desired.

Turning now to FIG. 3, the seams 72, 74 and 76 also may optionally include optical trenches T2, T3, T4, extending into the seams 72, 74, and 76 respectively. Similar to the trench T1, the trenches T2, T3, T4 are generally resistant to both optical and thermal conductivity, thereby reducing the thermal transmission between the connected components. As with the trench T1, it will be appreciated that the shape and size of the trenches T2, T3, and T4 may vary based on various design choices, manufacturing techniques, and optical connectivity tolerance.

In accordance with the disclosed example, the thermal isolation seams provide a more thermally resistant seam between silicon components by thermally isolating each of the planar lightwave circuits from the other components of the VOA-MUX as much as possible, while still maintaining optical connectivity. Thermal isolation in accordance with the disclosed example may be achieved at least in part by providing a thermal air gap, trenched optical seam, or a combination thereof.

The thermal isolation seams described above may be used on a variety of fabricated VOA-MUX structures having any number of different components such as, by way of example rather than limitation a VOA-MUX having a number of planar lightwave circuits including: an array waveguide grating in combination with a variable optical attenuator; an array waveguide grating in combination with a power monitor and a variable optical attenuator; a variable optical attenuator in combination with a power monitor; a power monitor in combination with a variable optical attenuator and another power monitor; an array waveguide grating in combination with a power monitor; or other similar combinations.

Turning now to FIG. 4, there is illustrated an example of an optical network 100 utilizing the VOA-MUX 10. The optical network includes a transmitter 102 coupled to a plurality of optical waveguides, such as optical fibers 104. The optical fibers 104, are coupled to the VOA-MUX 10 through one of the fiber array blocks 18, 20. The other one of the fiber array blocks 18, 20 is coupled to an optical waveguide, such as optical fiber 106. The optical fiber 106 is the coupled to a receiver 108. The design and structure of the optical network 100 may include numerous variations additions and other components, including by ways of example and not limitation, data inputs, amplifiers, repeaters, error detectors, signal analyzers, phase detectors, and/or additional optical devices. Additionally, the number and type of optical waveguides may vary according to the design desires.

In operation, the assembled components are adapted to carry and modify an optical signal as desired. For example, in the disclosed embodiment, a plurality of optical signals may by propagated by the transmitter 102 along the plurality of optical fibers 104 and enter into the fiber array block 18. The fiber array block 18, being optically coupled to the array waveguide grating 12, then allows the transmission of the optical signals into the array waveguide grating 12, wherein the optical signals are multiplexed into the form of a single, complex signal carrying multiple signals or streams of information at the same time. The complex signal is then propagated from the array waveguide grating 12 to the optically coupled variable optical attenuator 14, wherein the complex signal is attenuated (e.g., the strength of the signal is adjusted) as needed.

After attenuating, the complex signal is transmitted through the optically connected power monitor 16 to measure and control the attenuation level and to maintain a constant known output power. The complex signal may be propagated through the fiber array block 20 and along the output optical fiber 106. Finally, the complex optical signal may terminate at the receiver 108.

While the described operation includes the combination of multiple optical signals into a complex signal, the disclosed variable optical attenuator multiplexer may be utilized to separate a complex signal into its component optical signals for transmission along individual optical fibers. Furthermore, depending upon the components designed into the variable optical attenuator multiplexer, the modifications to the optical signals propagated through the device may vary.

Although the teachings of the invention have been illustrated in connection with certain embodiments, there is no intent to limit the invention to such embodiments. On the contrary, the intention of this application is to cover all modifications and embodiments fairly falling within the scope of the appended claims either literally or under the doctrine of equivalents.

What we claim is:

1. An apparatus for optical multiplexing comprising:
   first and second planar lightwave circuits, each of the first and second planar lightwave circuits having an edge; and
   wherein the first and second planar lightwave circuits are joined at a first portion of the edges forming an optically conductive seam, and are separated at a second portion of the edges, wherein the optically conductive seam has a thickness less than the thickness of the edges of the first and second planar lightwave circuits to form a trench along at least a portion of the optically conductive seam.

2. The apparatus of claim 1, wherein the trench comprises a generally rectangular cross section.

3. The apparatus of claim 1, wherein the trench extends longitudinally along at least a portion of the thermally isolating optical seam.

4. The apparatus of claim 1, wherein the separated second portion of the edges forms a gap.

5. The apparatus of claim 4, wherein the gap is a generally v-shaped gap.

6. The apparatus of claim 4, wherein the gap is bound by the edge of first planar lightwave circuit and the edge of the second planar lightwave circuit, and wherein the edge of the first planar lightwave circuit and the edge of the second planar lightwave circuit intersect at a sixteen degree angle.

7. The apparatus of claim 1, further comprising at least one optical waveguide coupled to at least one of the first planar lightwave circuit and the second planar lightwave circuit.

8. The apparatus of claim 1, wherein the apparatus further comprises a third planar lightwave circuit having an edge, wherein a first portion of the edge of the third planar lightwave circuit is joined to a first portion of a second edge of the second planar lightwave circuit, and wherein a second portion of the edge of the third planar lightwave circuit is separated from a second portion of the second edge of the second planar lightwave circuit.

9. An apparatus for optical multiplexing comprising:
   an array waveguide grating and a variable optical attenuator, each of the array waveguide grating and the variable optical attenuator having an edge; and
   wherein the array waveguide grating and the variable optical attenuator are joined at a first portion of the edges to form an thermally isolating optical seam, and are separated at a second portion of the edges to form a gap between the second portion of the edges.

10. The apparatus of claim 9, wherein the thermally isolating optical seam has a thickness less than the thickness of the edges of the array waveguide grating and the variable optical attenuator to form a trench along at least a portion of the thermally isolating optical seam.

11. The apparatus of claim 10, wherein the trench extends longitudinally along at least a portion of the thermally isolating optical seam.

12. The apparatus of claim 9, further comprising at least one optical waveguide coupled to at least one of the array waveguide grating and the variable optical attenuator.

13. The apparatus of claim 12, wherein the apparatus further comprises a power monitor having an edge, wherein a first portion of the edge of the power monitor is joined to a first portion of a second edge of the variable optical attenuator, and wherein a second portion of the edge of the power monitor is separated from a second portion of the second edge of the variable optical attenuator.

14. The apparatus of claim 13, further comprising at least one optical waveguide coupled to at least one of the array waveguide grating, the variable optical attenuator, and the power monitor.

15. An apparatus for optical multiplexing comprising:
a first and second planar lightwave circuit, each of the first and second planar lightwave circuits having an edge and an edge thickness; and
wherein the first and second planar lightwave circuits are joined at the edges to form an thermally isolating optical seam having a seam thickness, and wherein the seam thickness is less than each of the edge thicknesses to form a trench.

16. The apparatus of claim 15, wherein the first and second planar lightwave circuits are joined at a first portion of the edges forming the thermally isolating optical seam, and are separated at a second portion of the edges to form a gap.

17. The apparatus of claim 15, wherein the first planar lightwave circuit is an array waveguide grating and wherein the second planar lightwave circuit is a variable optical attenuator.

18. An optical network comprising:
a plurality of optical waveguides, each of the plurality of optical waveguides transmitting at least one optical signal; and
a variable optical attenuator multiplexer having a first planar lightwave circuit abutting and optically joined to a second planar lightwave circuit;
an optically conductive thermal isolating seam, the optically conductive thermal isolating seam having a reduced contact area between the first planar lightwave circuit and the second planar lightwave circuit.

19. The optical network of claim 18, wherein the optically conductive thermal isolating seam comprises a trench formed along at least a portion of the optically conductive thermal isolating seam.

20. The optical network of claim 18, wherein the optically conductive thermal isolating seam comprises a space formed along a portion of the optically conductive thermal isolating seam.

21. The optical network of claim 18, wherein the optically conductive thermal isolating seam comprises a space, the space disposed between at least a portion of an edge of the first planar lightwave circuit and an edge of the second planar lightwave circuit, and wherein the edge of the first planar lightwave circuit and the edge of the second planar lightwave circuit distance together bound the optically conductive thermal isolating seam.

* * * * *

UNITED STATES PATENT AND TRADEMARK OFFICE
CERTIFICATE OF CORRECTION

PATENT NO. : 7,356,210 B2
APPLICATION NO. : 10/877413
DATED : April 8, 2008
INVENTOR(S) : Wong et al.

It is certified that error appears in the above-identified patent and that said Letters Patent is hereby corrected as shown below:

On the Title Page:

Item (74), "Marshall" should be -- Marshall, --.

At Column 7, line 20, "an thermally" should be -- a thermally --.

Signed and Sealed this

Twelfth Day of August, 2008

JON W. DUDAS
*Director of the United States Patent and Trademark Office*